United States Patent
Sefcik et al.

(10) Patent No.: US 7,024,751 B2
(45) Date of Patent: Apr. 11, 2006

(54) HOUSING AND METHOD OF MANUFACTURING SAID HOUSING

(75) Inventors: Michael C. Sefcik, Linden, MI (US); Robert F. Veldman, Brighton, MI (US)

(73) Assignee: Metaldyne Company LLC, Plymouth, MI (US)

( * ) Notice: Subject to any disclaimer, the term of this patent is extended or adjusted under 35 U.S.C. 154(b) by 0 days.

(21) Appl. No.: 10/809,200

(22) Filed: Mar. 25, 2004

(65) Prior Publication Data

US 2004/0250406 A1    Dec. 16, 2004

Related U.S. Application Data

(60) Provisional application No. 60/457,437, filed on Mar. 25, 2003.

(51) Int. Cl.
*B23P 13/04* (2006.01)
*F16D 13/52* (2006.01)

(52) U.S. Cl. ............... 29/558; 29/557; 192/70.2
(58) Field of Classification Search .............. 29/557, 29/558, 897.2, DIG. 26; 192/70.2
See application file for complete search history.

(56) References Cited

U.S. PATENT DOCUMENTS

| | | | |
|---|---|---|---|
| 2,705,829 A | * | 4/1955 | Mock ............ 29/890.128 |
| 4,413,716 A | | 11/1983 | Newsome et al. |
| 5,388,474 A | | 2/1995 | Tanaka et al. |
| 5,878,479 A | * | 3/1999 | Dickerson et al. ........ 29/527.6 |
| 5,881,856 A | * | 3/1999 | Prater ................ 192/48.1 |
| 5,915,747 A | * | 6/1999 | Dickerson et al. ........ 29/527.6 |
| 5,987,728 A | | 11/1999 | Townsend et al. |
| 6,058,591 A | * | 5/2000 | Prater ................ 29/558 |
| 6,095,006 A | * | 8/2000 | Morita et al. .......... 74/434 |
| 6,868,950 B1 | * | 3/2005 | Masegi ............... 192/70.2 |
| 2004/0055845 A1 | * | 3/2004 | Friedrich et al. ........ 192/70.2 |

FOREIGN PATENT DOCUMENTS

JP    11101265 A  *  4/1999

* cited by examiner

*Primary Examiner*—Essama Omgba
(74) *Attorney, Agent, or Firm*—McDonald Hopkins Co., LPA; Robert H. Earp, III; Todd A. Benni

(57) ABSTRACT

A housing for a vehicle component and a method for making the same. The housing comprises a housing body having an interior surface and an exterior surface. The outer wall of the housing is formed with a plurality of longitudinal splines and a plurality of longitudinal troughs located between confronting splines. A spiral groove is cut into the interior surface of the outer wall so as to remove material sufficient to engage at least one of the troughs thereby forming a plurality of apertures having a closed periphery and extending longitudinally along the outer wall.

17 Claims, 3 Drawing Sheets

HOUSING AND METHOD OF MANUFACTURING SAID HOUSING

CROSS-REFERENCE TO RELATED APPLICATIONS

This application claims priority to U.S. Provisional Patent Application No. 60/457,437 filed on Mar. 25, 2003.

BACKGROUND OF THE INVENTION

I. Field of the Invention

This invention relates to housings for a vehicle component and the method of making the same and, in particular, to housings for a vehicle component and the method of making the same wherein oil escape apertures are longitudinally formed therein.

II. Description of the Prior Art

Manufacturers are continually developing more cost effective methods of developing automobile and truck components to reduce the manufacturing costs of vehicles. Metal components may be stamped, flow formed from a blank, and even formed from powder metal depending upon the configuration of the part.

Clutch housings for automatic transmissions and transfer cases have a generally cup-shaped configuration with an axial hub. The outer wall of the housing includes an interior surface having a plurality of longitudinal splines that can be acted upon like the teeth of a gear wheel. Typically, the clutch housing is flow formed from a blank to the desired configuration. Several machining operations are performed to form the desired configuration including punching apertures in the outer wall of the housing to create oil escape holes. This extra step requires the purchase and use of hole-punch machines adding to the cost of manufacturing the clutch housing. In addition, such hole-punching machines provide little flexibility in altering the position of the oil escape holes.

Another method of forming clutch housings having oil escape apertures is disclosed in applicant's commonly owned U.S. Pat. No. 5,987,728 issued to Townsend et al. on Nov. 23, 1999, hereby incorporated by reference herein. The '728 patent discloses a method for forming a clutch housing wherein the interior surface of the outer wall of the housing is formed with a plurality of longitudinal splines formed at a predetermined depth. A circumferential groove is formed in the exterior surface of the housing outer wall at a depth sufficient to intersect the select splines of the interior surface thereby forming apertures through the wall of the housing. However, while the '728 invention was an improvement over the prior art, the placement of oil escape apertures was restricted to within the circumferential groove only.

There is a constant need in the art to provide a housing and method for making a housing that is more cost efficient than previously known in the art, that eliminates the drilling of individual oil escape apertures though the housing, that reduces the total cycle time required to make the housing, that reduces the price of the housing, and that permits greater flexibility regarding placement of oil escape apertures.

SUMMARY OF THE PRESENT INVENTION

This invention overcomes the disadvantages of the prior known housings and methods for manufacturing such housings by providing means for forming oil escape apertures longitudinally along the housing outer wall.

The housing of the present invention has a generally cup-shaped configuration with an axial hub. The housing is preferably flow formed to a configuration from a metal preform or blank. The flow forming operation forms a plurality of splines having associated troughs therebetween. It should be noted that while the preferred embodiment of the present invention utilizes forming splines and troughs on the exterior surface of the housing outer wall, the opposite configuration disclosed in the '728 patent could also be utilized. Therefore, cutting a spiral groove along either the exterior surface or interior surface of the housing outer wall, depending on the placement of the splines and troughs, results in the formation of oil escape apertures distributed longitudinally along the outer wall thereby improving efficient oil escape.

The number and configuration of the splines and troughs is determined by the desired operating characteristics of the clutch housing. However, at least one of the troughs is formed at an increased depth from the other troughs thereby decreasing the minor inner diameter of the housing at predetermined intervals. Accordingly, any number of troughs of any number of configurations can be manufactured to an increased depth to provide for any number and configuration of apertures to be formed therefrom.

A groove is machined into the outer wall of the housing to a depth which will intersect the troughs of increased depth thereby forming oil escape apertures through the outer wall of the housing. The dimensions of the oil escape apertures are determined by the width of the groove (forming the axial length of the aperture) and the width of the trough (forming the circumferential width of the aperture). Thus, the number, spacing, and size of the apertures will be determined by the troughs formed in the outer wall of the housing and the groove machined on the opposite surface therefrom.

By varying key features such as the trough or spline dimensions, trough width and depth, and spiral groove width, length, and pitch, oil escape holes can be formed longitudinally anywhere along the housing outer wall without the need to punch through the housing. Other objects, features and advantages of the invention will be apparent from the following detailed description taken in connection with the accompanying drawings.

BRIEF DESCRIPTION OF THE DRAWINGS

The present invention will be more fully understood by reference to the following detailed description of a preferred embodiment of the present invention when read in conjunction with the accompanying drawings.

DETAILED DESCRIPTION OF THE PREFERRED EMBODIMENT

Figure 1:
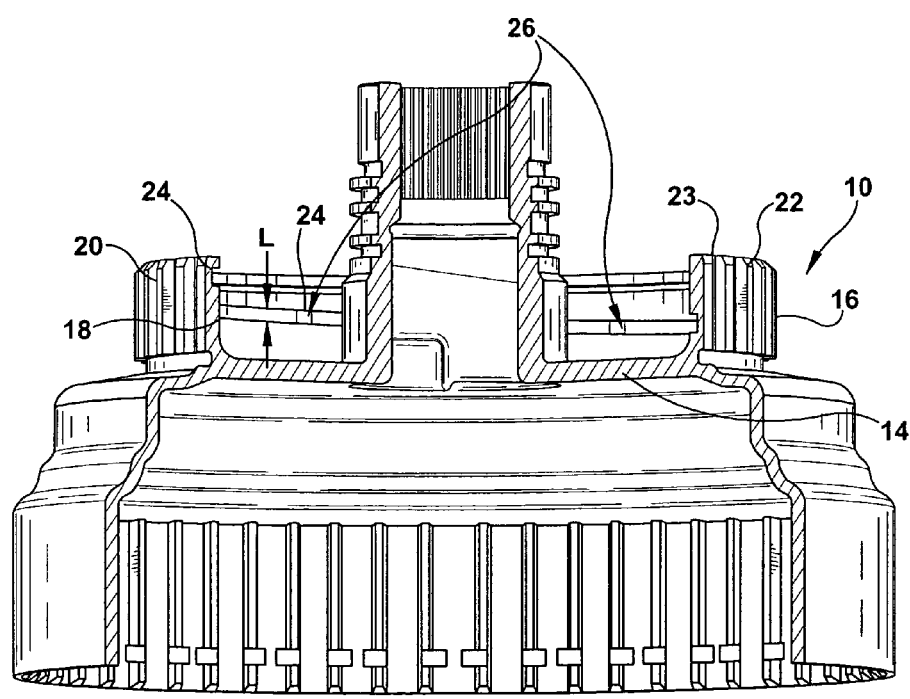
FIG. 1 is a partial cut away view of the transmission clutch housing of the present invention and formed using the method of the present invention.
Figure 2:
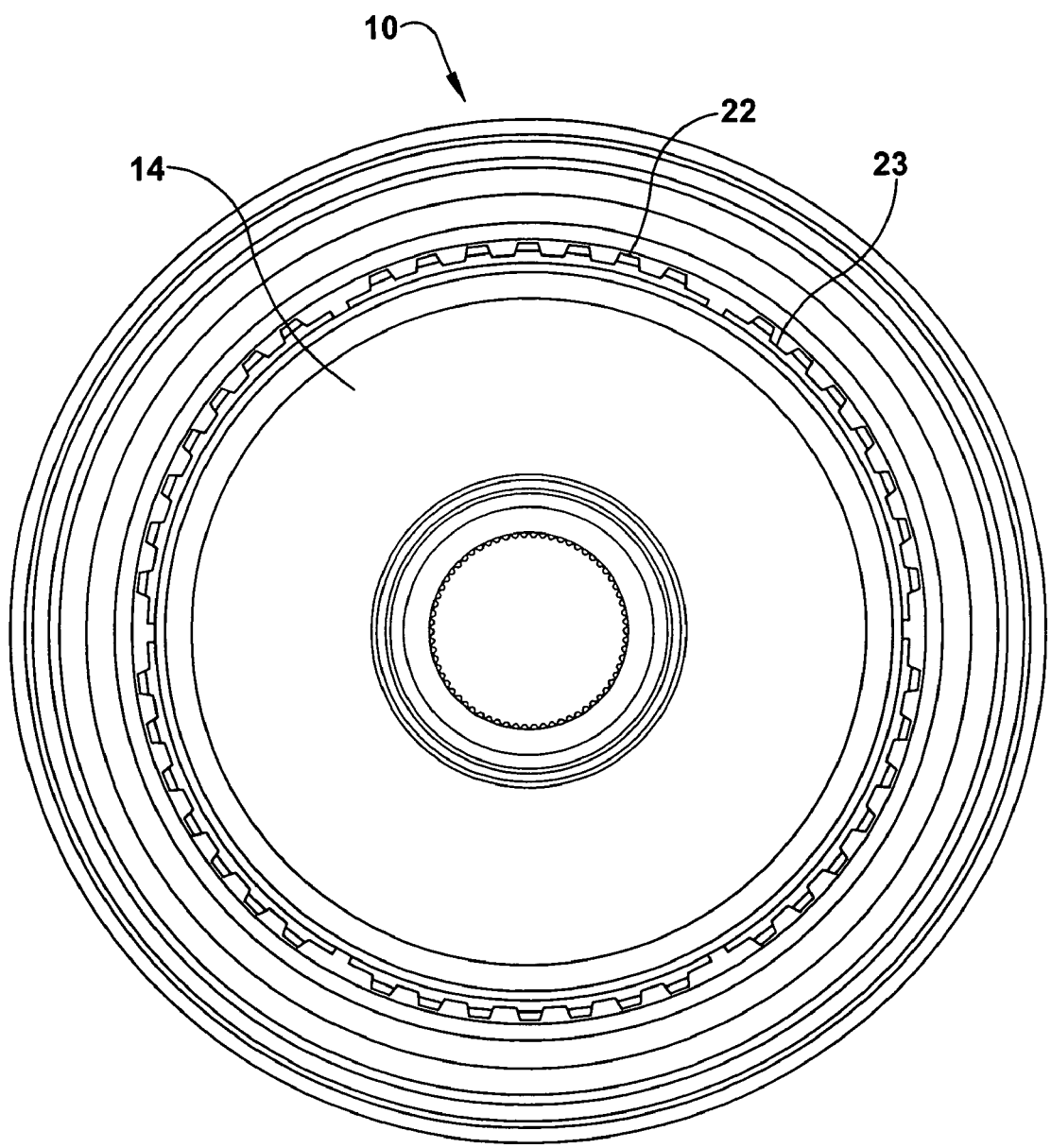
FIG. 2 is a plan view of the housing of FIG. 1.
Figure 3:
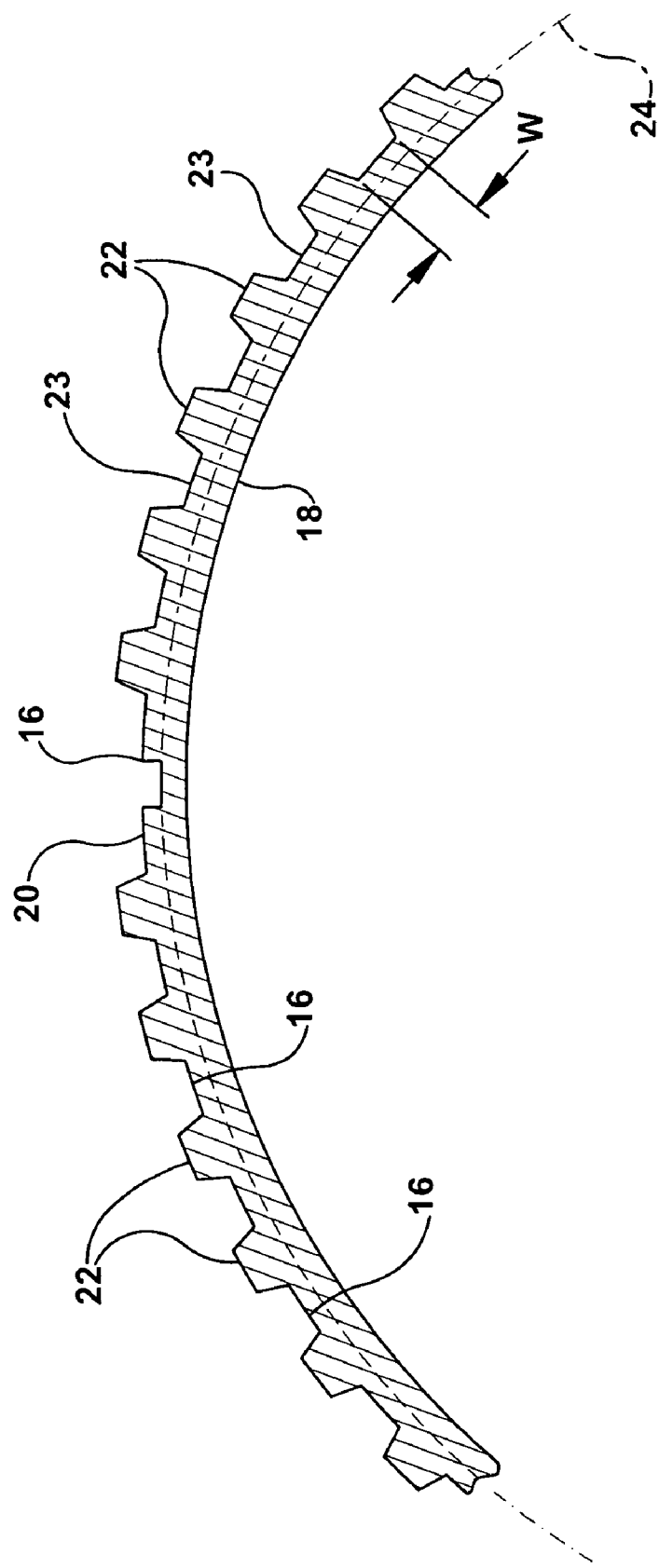
FIG. 3 is an enlarged partial view of the outer wall the housing.

Referring to the drawings, there is shown a housing 10 adapted to be used in transmissions and transfer cases for vehicles. However, it should be evident to those skilled in the art that the present invention could be utilized for any housing requiring the formation of apertures longitudinally therein. Nevertheless, the preferred embodiment of the present invention is herein described as directed to a clutch housing 10 having a plurality of oil escape apertures and the method of manufacturing such a clutch housing 10.

As best shown in FIG. 1, the clutch housing 10 has a generally cup-shaped configuration with an inner hub wall 14 and an outer peripheral wall 16. The outer wall 16 includes an inner surface 18 defining an inner diameter and an outer surface 20 defining an outer diameter. In accordance with the operating characteristics of the clutch housing 10, a series of longitudinal splines 22 and troughs 23 are formed in the surface of the outer wall 16. As described above, the splines 22 and troughs 23 may be formed on either the inner surface 18 or outer surface 20 of the outer wall 16. The splines 22 and troughs 23 may be formed at varying intervals, lengths and depths for operation in a predetermined manner. In accordance with the present invention, at least one and preferably a plurality of the troughs 23 are formed at a depth greater than the standard trough depth. The interval and number of troughs 23 with increased depth are dependent upon the desired number of apertures desired through the outer wall 16 of the finished clutch housing 10. Although the selected troughs 23 are formed at an increased depth, sufficient wall structure remains.

In order to form the oil escape apertures, the surface opposite the surface on which the splines 22 and troughs 23 are formed is cut to form a spiral groove 24 substantially transverse to the longitudinal splines 22. The spiral groove 24 is machined to a depth sufficient to engage the increased depth of the troughs 23 thereby forming an aperture 26 through the outer wall 16. The width W of the aperture 26 is determined by the width of the trough 23 while the length L of the aperture 26 is determined by the width of the spiral groove 24. Thus, the outer or inner diameter of the outer wall can be machined accordingly when oil escape apertures need to be formed in the clutch housing 10.

As shown in FIG. 1, the spiral groove 24 provides that the apertures 26 formed in the outer wall may be spaced about the length of the housing 10 and permits the escape of oil through the apertures 26 at different longitudinal positions. Thus, since these apertures 26 do not need to be punched longitudinally along the housing 10 and the outer wall of the housing 10 must be machined, the desired apertures 26 can be formed at little or no extra cost in manufacturing. Furthermore, the size of the apertures 26 can be more precisely controlled through the dimensional formation of the splines and troughs and dimensional formation and length of the spiral groove.

In the preferred method of manufacture the housing 10, the housing 10 is flow formed from a solid or preformed blank. During the flow forming operation, the splines 22 and troughs 23 are formed in the outer surface 20 of the outer wall 16 including spline troughs of a greater depth than the other troughs so as to eventually form the apertures 26. Thereafter, the inner surface 18 is cut with a spiral groove 24 to the desired configuration so as to intersect the selected troughs 23. The dimensions of the groove 24 in conjunction with the dimensions of the spline troughs 23 will determine the configuration of the apertures 26 formed through the outer wall 16 of the clutch housing 10. Accordingly, while the method still requires flow forming and machining apparatus, an apparatus for punching the apertures 26 in the housing wall 16 is no longer needed.

The foregoing detailed description has been given for clearness of understanding only and no unnecessary limitations should be understood therefrom as some modifications will be obvious to those skilled in the art without departing from the scope and spirit of the appended claims.

Having thus described the invention, we claim:

1. A housing for a vehicle component, said housing comprising:
    a housing body having an outer wall, said outer wall having an interior surface and an exterior surface;
    a plurality of longitudinal splines located on one of said exterior surface or said interior surface of said outer wall;
    a plurality of longitudinal troughs located between confronting splines, at least one of said troughs formed at a predetermined first depth; and
    a spiral groove cut into either the exterior surface or interior surface of said outer wall opposite said splines so as to remove material sufficient to engage at least one of said troughs formed at said first depth thereby forming a plurality of apertures having a closed periphery and extending longitudinally along said outer wall.

2. The housing of claim 1, wherein said apertures have dimensions corresponding to the width of said machined groove and the width of said trough.

3. The housing of claim 2 wherein said splines and troughs are located on the exterior surface of said outer wall and said groove is cut into said inner surface of said outer wall.

4. The housing of claim 2 wherein said splines and troughs are located on the interior surface of said outer wall and said groove is cut into said exterior surface of said outer wall.

5. The housing of claim 1, wherein said splines comprise various configurations.

6. The housing of claim 5, wherein said troughs comprise various configurations.

7. The housing of claim 1, wherein said housing body is flow formed with said outer wall and said longitudinal splines are flow formed with said outer wall.

8. The housing of claim 1, wherein said housing is a clutch housing for use in vehicle transmission assemblies.

9. A method for forming a housing for a vehicle component comprising the steps of:
    forming a housing body having an outer wall, said outer wall having an interior surface and an exterior surface;
    forming a plurality of longitudinal splines located on one of said exterior surface of said outer wall or said interior surface of said outer wall;
    forming a plurality of longitudinal troughs located between confronting splines, at least one of said troughs formed at a predetermined first depth; and
    cutting a spiral groove into either the exterior surface or interior surface of said outer wall opposite said splines so as to remove material sufficient to engage at least one of said troughs formed at said first depth thereby forming a plurality of apertures having a closed periphery and extending longitudinally along said outer wall.

10. The method for forming a housing as described in claim 9, wherein said apertures have dimensions corresponding to the width of said machined groove and the width of said trough.

11. The method for forming a housing as described in claim 10, wherein said splines and said troughs are formed on said exterior surface of said outer wall and said groove is cut into said inner surface of said outer wall.

12. The method for forming a housing as described in claim 10, wherein said splines and said troughs are located on said interior surface of said outer wall and said groove is cut into said exterior surface of said outer wall.

13. The method for forming a housing as described in claim 9, wherein said splines comprise various configurations.

14. The method for forming a housing as described in claim 9, wherein said troughs comprise various configurations.

15. The method for forming a housing as described in claim 9, wherein said housing body is flow formed with said outer wall and said longitudinal splines are flow formed with said outer wall.

16. The method for forming a housing as described in claim 9, wherein said housing is a clutch housing for use in vehicle transmission assemblies.

17. In a housing for a vehicle component comprising a housing body having an outer wall, said outer wall having an interior surface and an exterior surface, said outer wall having a plurality of longitudinal splines located on one of said exterior surface or said interior surface, said outer wall having a plurality of longitudinal troughs located between confronting splines wherein at least one of said troughs is formed at a predetermined first depth, the improvement comprising:

a spiral groove cut into either the exterior surface or interior surface of said outer wall opposite said splines so as to remove material sufficient to engage at least one of said troughs formed at said first depth thereby forming a plurality of apertures having a closed periphery and extending longitudinally along said outer wall.

* * * * *